Patented Sept. 4, 1945

2,384,010

UNITED STATES PATENT OFFICE 2,384,010

METHOD OF PRODUCING MAGNESIUM SULPHATE

Hellmuth R. Brandenburg, Grass Valley, Calif., assignor to Idaho Maryland Mines Corporation, San Francisco, Calif., a corporation of Nevada No Drawing. Application June 8, 1943,
Serial No. 490,100

13 Claims. (Cl. 23—128)

This invention relates in general to a method of producing magnesium sulphate, and more particularly to a method of producing this salt from magnesium oxide or magnesium oxide bearing materials by the use of sulphurous acid.

In my co-pending applications, Serial Nos. 459,044 and 463,304, filed respectively on September 19 and October 23, 1942, there are disclosed a process for so calcining serpentine and other unstable, hydrous magnesium silicates, that the calcine contains a maximum of magnesium oxide in readily available form and a process for producing from such a calcine a soluble magnesium salt substantially free of impurities.

The former process briefly comprises calcining, just short of dead burning, an unstable, hydrous magnesium silicate, such as serpentine, preferably in as highly a comminuted form as economically feasible, this degree of calcination being indicated by the presence in the calcine of a measurable quantity of residual water of combination (.6% to 8.0% loss of ignition).

The latter process briefly comprises treating the calcine derived from the former process with a suitable acid to produce a magnesium salt solution, separating the gangue and impurities from the solution, and in finally evaporating the magnesium salt from the purified solution. For purposes of illustration in my co-pending application, Serial No. 463,304, the process is carried out by the use of hydrochloric acid, with the consequent formation of magnesium chloride.

Although it is recognized in the aforementioned application that the process therein disclosed could be generally resorted to for producing various soluble magnesium salts, depending upon the particular acid used, I have since discovered that magnesium sulphate can be produced more efficaciously by treating the calcine, or other source of magnesium oxide initially with sulphurous acid, rather than with sulphuric acid, which ordinarily would be resorted to, and that by so doing, some of the objectionable subsidiary reactions and by-products resulting, can be avoided.

More specifically, I have discovered that contrary to expectation, sulphurous acid reacts with calcined serpentine and other sources of magnesium oxide, such as magnesite, calcined magnesite, and brucite, far more rapidly and completely than do other acids such as sulphuric acid. Furthermore, in using sulphurous acid for producing magnesium sulphate from unstable hydrous magnesium silicate, such as serpentine, the non-salt yielding and inert silicious remainder, or waste matter is not converted to a collodial mass of high viscosity or gelatinous form, as is the case when other acids such as sulphuric acid is used. This, translated into operative procedure and economy, means that when using sulphurous acid, the necessity of controlling the hydrogen ion concentration, and the fluidity of the mass under treatment by the addition of water is obviated. Obviously, the less water that is held in process, the less energy is required to evaporate the magnesium sulphate from the purified solution.

In general then, the object of this invention is the provision of a method of producing substantially pure magnesium sulphate from magnesium oxide, and magnesium oxide bearing materials such as the calcines of unstable, hydrous magnesium silicates, by the use of sulphurous acid. Other objects and advantages of the present invention will be apparent from the following description:

Although by the elimination of certain steps, my process can be used for producing magnesium sulphate from pure magnesium oxide, as well as from the calcines of various unstable, hydrous magnesium silicates, I prefer to apply the process to the production of magnesium sulphate from a serpentine calcined in accordance with the method set forth in my co-pending application Serial No. 459,044, for then not only the basic process but also certain desirable purifying steps can be more readily illustrated. In this connection it should be borne in mind that although the chemical formula of serpentine is given generally as $3MgO.2SiO_2.2H_2O$, in its natural state it sometimes has incorporated with it small amounts of alumina, calcium, iron, potassium and sodium. A serpentine calcined just short of dead burning, may, therefore, be considered as comprising compounds between silica (the acid) and magnesia, lime, alumina, the alkalies and nickel, with chrome in part only (the bases), the greater portion of the chrome content existing as chromite, an iron chrome compound. The percentage composition of the individual components of the serpentine calcine is as follows, but I do not wish this to be construed as a limiting composition: silica, $SiO_2$ (43.90%); iron, $Fe_2O_3$ (7.48%); alumina $Al_2O_3$ (1.76%); calcium $CaO$ (0.20%); magnesium $MgO$ (total) (41.10%); chrome $Cr_2O_3$ (0.76%); nickel, Ni (0.27%); alkalies $K_2O.Na_2O$ (1.15%); and loss on ignition (3.18%).

To this end, a mass of serpentine previously calcined to form magnesium oxide and preferably comminuted as finely as economically justified, is intimately contacted at atmospheric temperature with sulphurous acid in an amount sufficient to convert substantially all of its magnesium oxide, calcium oxide contents, a portion of iron and perhaps a trace of alumina, and small amounts of the potassium and sodium contents to the sulphite and sulphate salts of these metals, and which will, incidentally, dissolve some of its silica content. These various reactions may be explained by citing as an example the reaction with magnesium oxide, since this is our prime and valuable component;

$$MgO + H_2SO_3 = MgSO_3 + H_2O$$

It is well known that it is impossible, under commercially prevailing conditions when no attempt is made to separate sulphur trioxide from sulphur dioxide, to produce sulphur dioxide ($SO_2$) free from sulphur trioxide ($SO_3$); say by the roasting of pyritic material to produce sulphur dioxide. We may therefore also write:

$$2MgO + SO_2 + SO_3 + 2H_2O = MgSO_3 + MgSO_4 + 2H_2O$$

Although magnesium sulphate as well as magnesium sulphite, is formed, the latter predominates as a result of the above reactions. The reactions between the acids and the bases forming the minority constituents take place in a manner analogous to that cited for the magnesium compound.

The proper contact between the sulphurous acid and calcine required to produce these reactions, can be obtained in any manner desired. For example, the sulphurous acid and a slurry of the calcine can be agitated together in a tank, or sulphur dioxide gas can be passed through an aqueous slurry of the calcine, either with or without mechanical agitation.

Following the reaction between the calcine and sulphurous acid, the resulting solution is separated from the insolubles by any desired method, such as, for example, by filtration, a displacement wash being applied to the filter cake in accordance with standard practice.

All of the sulphurous acid remaining in the filtrate must then be either expelled in the form of sulphur dioxide or oxidized to sulphuric acid, and the magnesium and iron sulphites oxidized to magnesium and iron sulphates. These reactions can be accomplished in part by heating the solution, by violently agitating the solution with air, or by spraying the solution through air. Heating alone will not effect oxidation of sulphite to sulphate, it will drive off the unattached free sulphur dioxide. Oxidation of sulphite to sulphate can be effected by spraying with or through air; even so free sulphurous acid must be first eliminated. Both sulphurous acid and its salts (sulphites) are not very stable compounds and will oxidize by contact with air and by virtue of the oxygen content of air—but the oxidational effects are slow. Elimination of the sulphur dioxide can be brought about by boiling a solution containing this acid or by a gradual displacement of the sulphur dioxide held in solution (generally regarded as $H_2SO_3$, i. e., $H_2O + SO_2$) by other gases, such as the nitrogen and oxygen of the atmosphere and in this manner a small portion of the sulphurous acid will become converted to sulphuric acid and a small portion of the sulphite salt to the sulphate salt. The oxidational effect is very largely a function of the surface area presented by the liquid matter to the gas ($O_2$), that is when a liquid medium containing sulphur dioxide gas or a sulphite salt is agitated with air, the oxidational effect is measurably less than it would be if the liquid were converted into a fine spray, or mist, and sprayed with or into air. These enhanced reaction velocities, or oxidation effects, as a function of increased surface area, hold true not only for $O_2$, as in atmospheric air, but appear even more pronounced with $O_3$ as in ozonized air. Usually a catalytic agent, such as for instance manganous sulphate, is admixed as an oxygen carrier and fixation agent. This is a true catalytic effect because the manganous sulphate is not oxidized to manganic salt; this effect is well known. The reaction involved with air as the dispersing or spraying medium, and magnesium sulphite and iron sulphite is given in the following equations: $2MgSO_3 + O_2 = 2MgSO_4$; and $$2FeSO_3 + O_2 = 2FeSO_4$$

To oxidize the residual fractions of sulphurous acid, magnesium sulphite, and iron sulphite remaining in the solution to sulphuric acid, magnesium sulphate and iron sulphate respectively, the solution is subjected to the action of chlorine gas, any compound capable of yielding chlorine gas, such as sodium hypochlorite, or ozone by passing these gases through the solution. The chemical equations representing these reactions pertain to the magnesium salt and by analogy, to other metal salts that may be present, and are as follows:

$$MgSO_3 + Cl_2 + 2H_2O = MgSO_4 + 2HCl + H_2O$$

and $$2MgSO_3 + 2O_3 = 2MgSO_4 + 2O_2$$

If chlorine gas is used, care should be taken to use no more of it than necessary to complete the required reactions. An excess of chlorine would not of itself serve to form magnesium chloride $MgCl_2$ from magnesium sulphate $MgSO_4$. Since the $SO_3$ radical is the stronger of the two it would primarily serve to saturate the solution with respect to $Cl_2$ and this would require removal by boiling, or other means. Excess $Cl_2$ might give rise to some hypochlorite formation if excess MgO were present and unless the $Cl_2$ is first ejected.

On the other hand, if ozone is resorted to, it can be used in an amount less than that theoretically required, for apparently the ozone in some way serves as a catalytic, as well as an oxidizing agent. The nature of catalytic reactions, at its best, is not yet clearly understood. In the case of ozone we can and do assume that ozone (or intermediate reaction products formed in the oxidational cycle) in some unexplained manner activates some of the simultaneously passed oxygen derived from the unozonized part of the air (air can only be ozonized to the average extent of from 3 to 5%) so that the oxygen required to oxidize a given compound, in this case outstandingly magnesium sulphite, is less than that corresponding to the strict stoichiometric requirement. Such effects are classed as auto-catalysis; but the uncertainty of their nature does not admit of putting them into quantitative equations.

Following the oxidation of the sulphites to sulphates, the iron sulphate is converted to iron hydroxide by the addition of magnesium oxide to the solution in an amount substantially sufficient to bring about the desired reaction as represented by the following equation:

$$Fe_2(SO_4)_3 + 3MgO + 3H_2O = 3MgSO_4 + 2Fe(OH)_3$$

The ferric hydroxide precipitate is then filtered from the solution. The resulting filtrate is free of substantially all impurities other than silica and possibly a small amount of calcium sulphate, and an unobjectionable trace of magnesium chloride. The alumina, sodium and potassium occur in amounts not adversely pertinent to the purity of the final product $MgSO_4 \cdot 7H_2O$. It is obvious that with $MgSO_4$ preponderating over other salts, that this would crystallize out in a high degree of purity.

To free the filtrate of the silica, and the calcium sulphate, the filtrate is concentrated by evaporation to a degree sufficient to salt out these compounds without salting out the magnesium sulphate. The concentrated solution is then filtered to remove the silica and calcium sulphate.

The resulting filtrate is substantially pure solution of magnesium sulphate from which the Epsom salt MgSO₄.7H₂O may be crystallized by evaporation. Any traces of magnesium chloride still contained in the solution will remain in the mother liquor, and consequently do not contaminate the Epsom salts.

It is possible to shorten somewhat the above process by letting the gangue or insolubles remain in the solution until the ferric hydroxide is formed, and then removing them with the hydroxide by a single filtration step, rather than by first separating out the gangue prior to the precipitation of the ferric hydroxide and later filtering out the hydroxide.

I claim:

1. The herein described process of producing magnesium sulphate from hydrous magnesium silicates containing silica and calcium salt as impurities which comprises: calcining the hydrous magnesium silicates just short of a dead roast to free magnesium oxide and silica; treating the calcine with sulphurous acid to form water soluble sulphite and sulphate salts of magnesium; adding sufficient water to form a slurry and heating the slurry to remove sulphurous acid gas; passing chlorine gas through the slurry to convert the sulphite salts into sulphate salts and any remaining sulphurous acid into sulphuric acid; adding sufficient magnesium oxide to precipitate iron sulphate as a hydrated oxide, and to form magnesium sulphate; evaporating the slurry to salt out the silica and calcium sulphate; filtering the slurry to obtain a clear liquor containing magnesium sulphate; and evaporating the filtrate to obtain pure magnesium sulphate.

2. The herein described process of producing magnesium sulphate from serpentine containing silica and calcium salts as impurities which comprises: calcining finely ground serpentine just short of a dead roast for freeing the magnesium oxide content from the calcine; suspending the calcine in an aqueous solution of sulphur dioxide to convert substantially all of the available magnesium oxide of the calcine into sulphite of magnesium; adding sufficient water to form a slurry and then filtering the slurry to separate out the solid waste matter and to obtain a clear solution containing magnesium sulphite; heating the filtrate to remove the greater portion of the sulphurous acid gas and to oxidize the sulphite salt to sulphate salt; treating the filtrate with chlorine gas to form sulphate salt and sulphuric acid; adding magnesium oxide to precipitated iron as a hydrated oxide and to form magnesium sulphate; concentrating the filtrate by evaporation until the silica and calcium salt are salted out, leaving the magnesium sulphate; filtering the filtrate to obtain a clear liquor; and in evaporating the liquor to obtain pure magnesium sulphate.

3. The herein described process of producing magnesium sulphate serpentine containing silica and calcium salts as impurities which comprises: calcining finely ground serpentine just short of a dead roast for freeing the magnesium oxide content from the calcine; suspending the calcine in water through which sulphur dioxide gas is passed to convert substantially all of the available magnesium oxide of the calcine into sulphite of magnesium; filtering the slurry to separate out the solid waste matter and obtain a clear solution containing magnesium sulphite; heating the filtrate to remove substantially all of the free sulphur dioxide gas and to oxidize the sulphite salt to sulphate salt; treating the filtrate with chlorine gas to form sulphate salts and sulphuric acid from dissolved sulphur dioxide gas and sulphite salts; adding additional calcine to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and evaporating the liquor to obtain pure magnesium sulphate.

4. The herein described process of producing magnesium sulphate from serpentine containing silica and calcium salt which comprises: calcining finely ground serpentine just short of a dead roast for freeing the magnesium oxide content from the calcine; adding water to the calcine to form a slurry and causing sulphurous acid to interact with the slurry to convert substantially all of the available magnesium oxide of the calcine into sulphite of magnesium; filtering the slurry to separate out the solid waste matter and to obtain a clear solution containing magnesium sulphite; heating the filtrate to remove the greater portion of the free sulphurous acid and to oxidize the sulphite salts to sulphate salts; treating the filtrate with chlorine gas to form sulphate salts and sulphuric acid from dissolved sulphur dioxide gas and sulphite salts; adding magnesium oxide to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and in evaporating the liquor to obtain pure magnesium sulphate.

5. The herein described process of producing magnesium sulphate from serpentine containing silica and calcium salts as impurities which comprises; calcining finely ground serpentine just short of a dead roast for freeing the magnesium oxide content from the calcine; subjecting the calcine to the action of a solution of sulphurous acid to convert essentially all of the available magnesium oxide of the calcine into sulphite of magnesium; filtering the slurry to separate out the solid waste matter and obtain a clear solution containing magnesium sulphite; subjecting the unheated filtrate to violent agitation while passing compressed air through it; treating the filtrate with chlorine gas to form sulphate salts and sulphuric acid from dissolved sulphur dioxide gas and sulphite salts; adding additional calcine or magnesium oxide to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and in evaporating the liquid to obtain pure magnesium sulphate.

6. The herein described process of producing magnesium sulphate from serpentine containing silica and calcium salts as impurities which comprises calcining finely ground serpentine just short of a dead roast for freeing the magnesium oxide content from the calcine; suspending the calcine in a solution of sulphurous acid to convert substantially all of the available magnesium oxide of the calcine into sulphite of magnesium; filtering the slurry to separate out the solid waste matter and obtain a clear solution containing magnesium sulphite; spraying the filtrate to provide a large surface area to the air; treating the filtrate with chlorine gas to form sulphate salts and sulphuric acid from dissolved sulphur dioxide gas and sulphite salts; adding additional calcine to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and in evaporating the liquor to obtain pure magnesium sulphate.

7. The herein described process of producing magnesium sulphate from serpentine containing silica and calcium salts as impurities which comprises: calcining finely ground serpentine just short of a dead roast for freeing the magnesium oxide content from the calcine; subjecting the calcine to the action of a solution of sulphurous acid to convert essentially all of the available magnesium oxide of the calcine into sulphite of magnesium; filtering the slurry to separate out the solid waste matter and obtain a clear solution containing magnesium sulphite; heating the filtrate to remove the greater portion of the free sulphur dioxide and to oxidize the sulphite salts to sulphate salts; treating the filtrate with ozone to form sulphate salts and sulphuric acid from dissolved sulphur dioxide gas and sulphite salts; adding magnesium oxide to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and in evaporating the liquor to obtain pure magnesium sulphate.

8. The herein described process of producing magnesium sulphate from serpentine containing silica and calcium salts which comprises: calcining finely ground serpentine just short of a dead roast for freeing the magnesium oxide content from the calcine; subjecting the calcine to the action of a solution of sulphurous acid to convert substantially all of the available magnesium oxide of the calcine into sulphite of magnesium; filtering the slurry to separate out the solid waste matter and to obtain a clear solution containing magnesium sulphite; heating the filtrate to remove the greater portion of the free sulphur dioxide and to oxidize the sulphite salts to sulphate salts; spraying the filtrate by compressed ozonified air to form sulphate salts and sulphuric acid from existing remnants of sulphurous acid and sulphite salts; adding additional calcine to precipitate iron as hydrated oxide and to form additional magnesium sulphate; concentrating the filtrate by evaporation until the silica and calcium sulphate are salted out, leaving the magnesium sulphate; filtering the filtrate to obtain a clear liquor; and in evaporating the liquor to obtain pure magnesium sulphate.

9. The process of producing magnesium sulphate from magnesium oxide which comprises, forming a solution of magnesium sulphite and magnesium sulphate by subjecting the magnesium oxide to the action of sulphurous acid; converting substantially all of the magnesium sulphite content of the solution to magnesium sulphate by the action of a gaseous oxidizng agent; and then removing the magnesium sulphate from the solution by crystallization.

10. The process of producing substantially iron-free magnesium sulphate from iron-contaminated magnesium oxide which comprises, forming a solution of the sulphites and sulphates of magnesium and iron by subjecting iron-contaminated magnesium oxide to the action of sulphurous acid; converting the sulphites of magnesium and iron to sulphate form by the action of a gaseous oxidizing agent; converting the iron sulphate to ferric hydroxide by the addition of magnesium oxide to the solution; separating the ferric hydroxide from the solution; and then removing the magnesium sulphate from the solution by crystallization.

11. The process of producing magnesium sulphate from magnesium oxide which comprises, forming a solution of magnesium sulphite with traces of magnesium sulphate and some free sulphurous acid by treating the magnesium oxide with sulphurous acid in greater than stoichiometric proportions; expelling sulphur dioxide gas and converting magnesium sulphite to magnesium sulphate by heating and agitating the solution; oxidizing the remaining sulphurous acid to sulphuric acid and the metal sulphites to sulphates by subjecting the solution to the action of a gaseous oxidizing agent; and then separating the magnesium sulphate from the solution by crystallization.

12. The process of producing magnesium sulphate from magnesium oxide which comprises, forming a solution of magnesium sulphite with traces of magnesium sulphate and some free sulphurous acid by treating the magnesium oxide with sulphurous acid in greater than stoichiometric proportions; expelling sulphur dioxide gas and converting magnesium sulphite to magnesium sulphate by heating and agitating the solution; oxidizing the remaining sulphurous acid to sulphuric acid and the metal sulphites to sulphates by subjecting the solution to the action of chlorine gas; and then separating the magnesium sulphate from the solution by crystallization.

13. The process of producing magnesium sulphate from iron-contaminated serpentine which comprises, calcining the serpentine to form reactive magnesium oxide and silica; forming a slurry containing inert siliceous pulp admixed with small amounts of undissolved magnesium sulphite together with silica and the sulphites and sulphates of magnesium and iron in solution by treating the calcine with sulphurous acid; converting the sulphites to sulphates by subjecting the slurry to the action of a gaseous oxidizing agent; converting the iron sulphate to iron hydroxide with the attendant formation of magnesium sulphate by adding magnesium oxide to the pulp and solution; removing the gangue and iron from the solution by filtration; and then crystallizing magnesium sulphate from the solution.

HELLMUTH R. BRANDENBURG.